United States Patent [11] 3,586,372

| [72] | Inventors | Chester J. Barecki<br>Grand Rapids;<br>Kenneth W. Hozeski, Grandville, both of,<br>Mich. |
|---|---|---|
| [21] | Appl. No. | 776,470 |
| [22] | Filed | Nov. 18, 1968 |
| [45] | Patented | June 22, 1971 |
| [73] | Assignee | American Seating Company<br>Grand Rapids, Mich. |

[54] RECLINER VEHICLE SEAT
4 Claims, 18 Drawing Figs.

[52] U.S. Cl. .................................................. 297/359,
297/366, 297/374
[51] Int. Cl. .................................................. B60n 1/06
[50] Field of Search .......................................... 297/359,
354, 355, 366, 360, 374, 422

[56] References Cited
UNITED STATES PATENTS

| 159,395 | 2/1875 | Damm | 297/359 |
| 730,320 | 6/1903 | Van Slyke | 297/359 |
| 1,701,604 | 2/1929 | Boery | 297/374 |
| 2,638,151 | 5/1953 | Jones | 297/359 |
| 2,730,165 | 1/1956 | Jones | 297/374 |
| 2,732,888 | 1/1956 | Jones | 297/374 |
| 2,760,556 | 8/1956 | Henrikson | 297/422 |
| 2,802,516 | 8/1957 | Liljengren | 297/374 |
| 2,962,087 | 11/1960 | Barecki | 297/359 X |
| 3,137,527 | 6/1964 | Hoven | 297/422 X |
| 3,042,449 | 7/1962 | Hutchinson | 297/366 |

FOREIGN PATENTS

| 1,203,929 | 10/1965 | Germany | 297/359 |

*Primary Examiner*—Francis K. Zugel
*Attorney*—Dawson, Tilton, Fallon & Lungmus

ABSTRACT: A vehicle seat has a base on which is pivotally mounted a seat back having a rigid back frame and to the back frame is releasably secured a cushion frame. A crash pad is secured to the rigid back frame, the pad being formed of thin deformable metal covered with a plastic coating and the pad extending over and interlocking with the frame top. A torsion spring in the frame urges the seat back forwardly and locking mechanism is controlled by safety release means in the arm rest. Cushion panels protect the knee-striking area. A foot rest is supported for movement following the contour of adjacent portions of the seat and back.

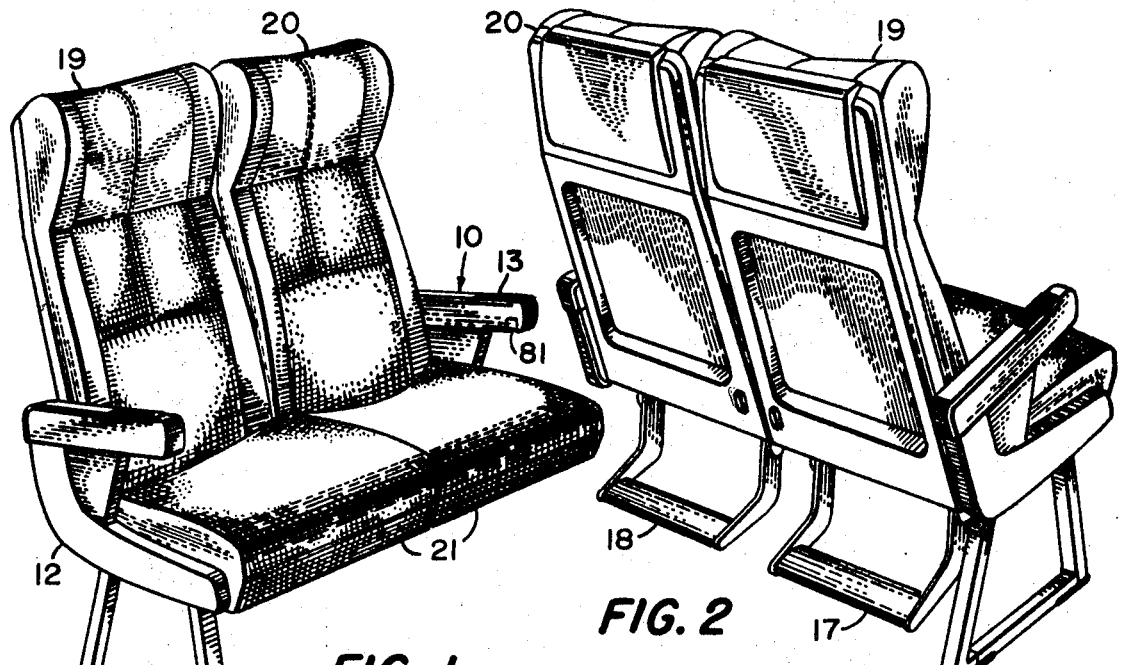
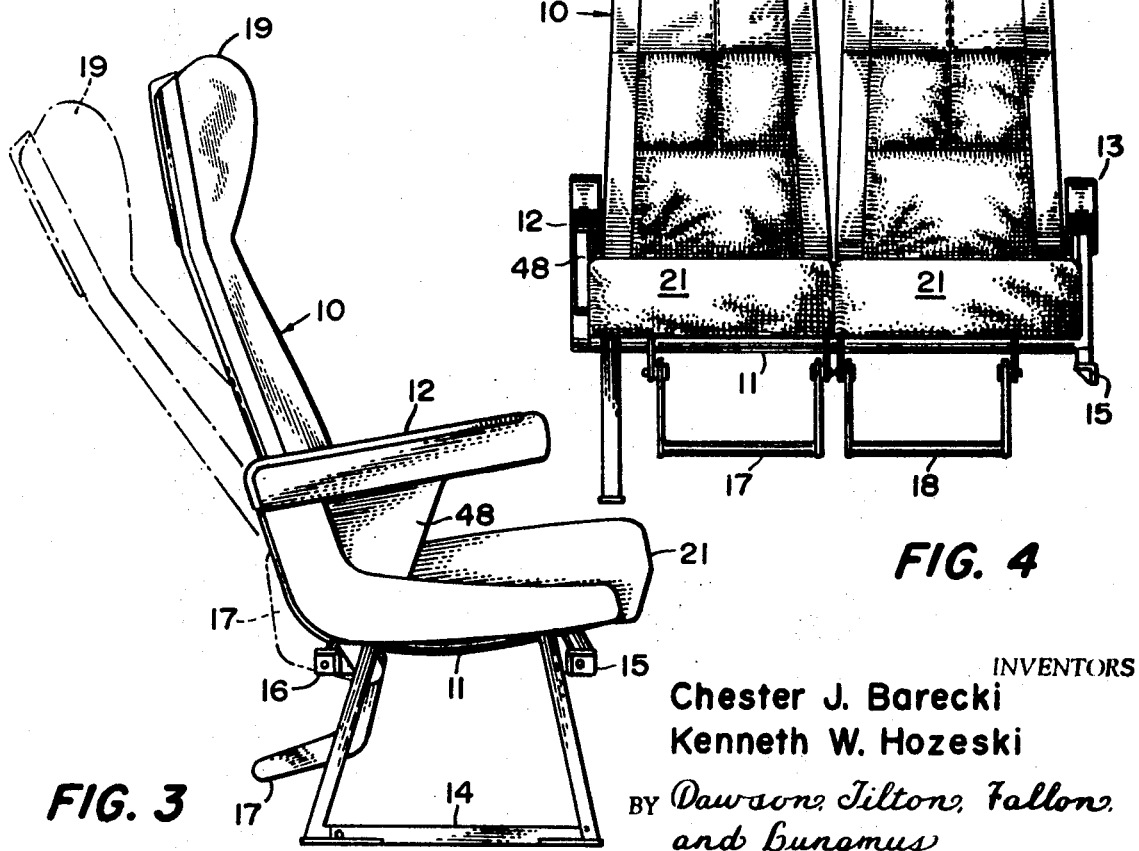
FIG. 1
FIG. 2
FIG. 3
FIG. 4
INVENTORS
Chester J. Barecki
Kenneth W. Hozeski
BY Dawson, Tilton, Fallon, and Lungmus
ATTORNEYS

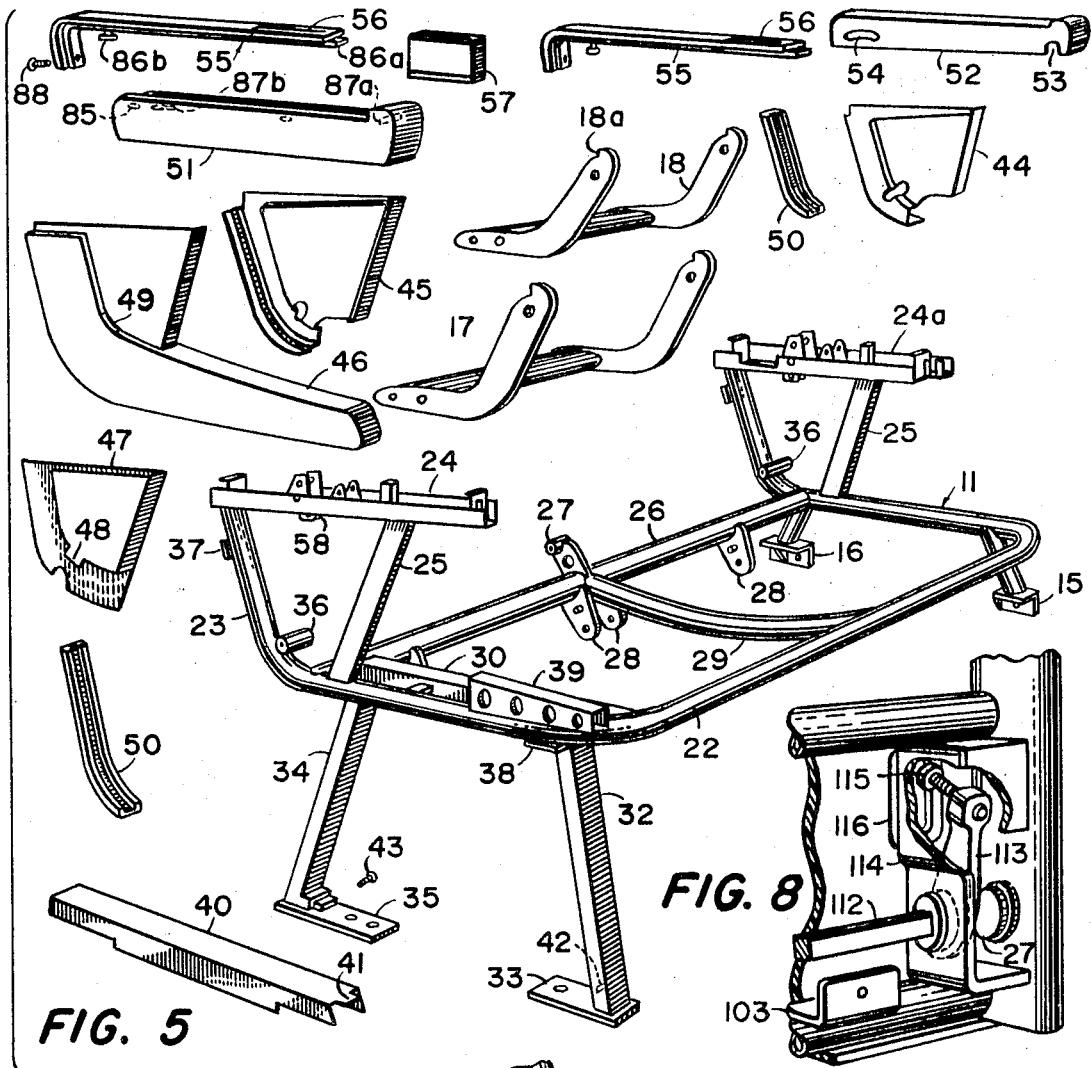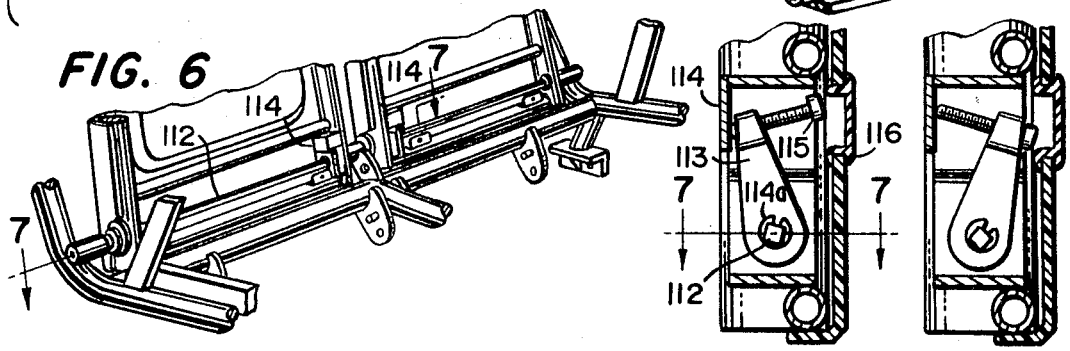

PATENTED JUN22 1971 3,586,372
SHEET 3 OF 4
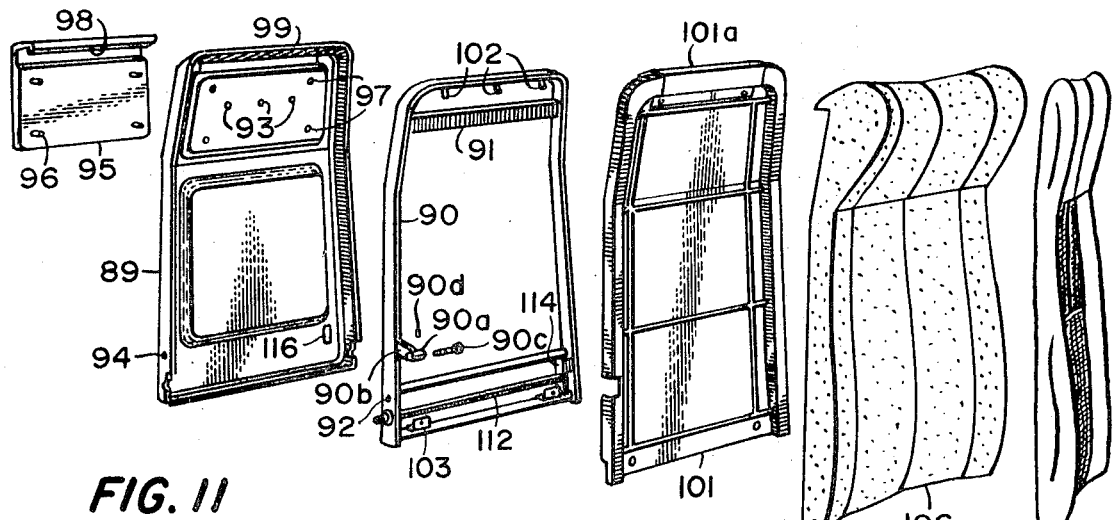
FIG. 11
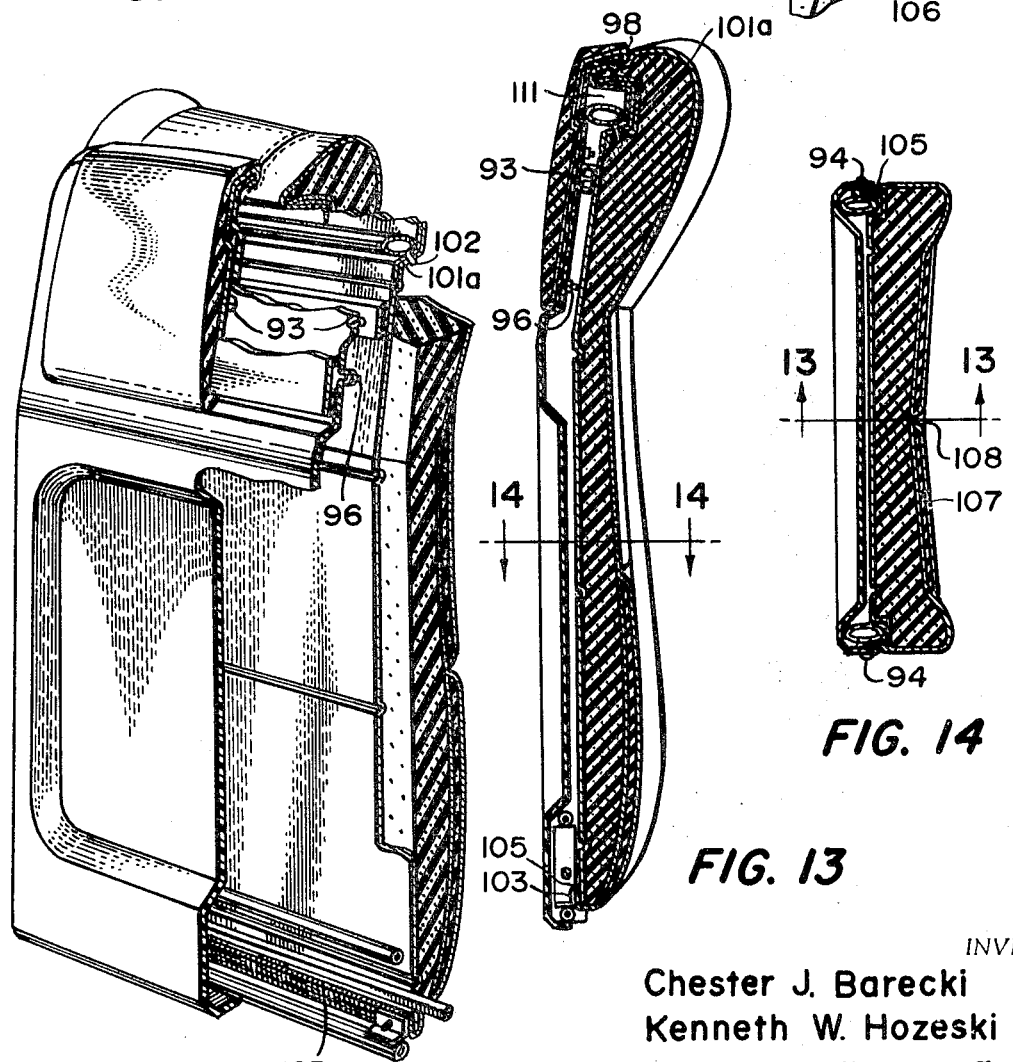
FIG. 12
FIG. 13
FIG. 14
INVENTORS
Chester J. Barecki
Kenneth W. Hozeski
BY Dawson, Tilton, Fallon, and Lungmus.
ATTORNEYS INVENTORS
Chester J. Barecki
Kenneth W. Hozeski
BY Dawson, Tilton, Fallon, and Lungmus.
ATTORNEYS

RECLINER VEHICLE SEAT

BACKGROUND AND SUMMARY

The back of a bus seat or other vehicle seat presents a problem in that after wear of the cushion it is necessary to disassemble the entire back in order to effect replacement or repair. The problem is complicated because the metal parts present a hazard in the case of collisions or sudden deceleration of the vehicle and it is desired to have permanent protective parts for the pivotally mounted back. Further, the arm rest of the vehicle equipped with forwardly projecting handles presents hazards in case of collision, etc. In vehicle seats there is a further problem of providing foot rests which may be moved under the seat when not in use to a nonhazardous position while also permitting the foot rest to be swung to a generally vertical position behind the seat back so as to conform to its contour.

We have discovered that the vehicle seat can be modified or designed to overcome the above difficulties and hazards. The seat back is provided with a rigid portion which can remain attached to the seat frame while at the same time the cushion itself is permanently supported upon a removable metal frame which can be readily removed from or secured to the permanent rigid frame. Further, with this structure there is provided a crash pad which is protected by the cushion and permanently anchored to the rigid frame to protect the occupant of the seat behind the seat back in question. In addition, improvements in the arm rest provide compact safety control mechanism so that the hazards heretofore present are removed. Supporting the foot rest upon a forwardly extending support below the seat frame and by shaping the foot rest with arcuate sidewalls similar to a boomerang, we have provided a structure which causes the foot rest to follow the contour of the adjacent portions of the seat and seat back. Other improvements and advantages will appear as the specification proceeds.

DRAWINGS

In the accompanying drawings,

FIG. 1 is a front perspective view of the reclining chair embodying our invention;

FIG. 2, a rear perspective view with the two backs in raised position and with two foot rests in a lowered position;

FIG. 3, a side view of the aisle side of the chair, dotted lines showing the reclined position of the back and raised position of the foot rest;

FIG. 4, a front view of the chair;

FIG. 5, an exploded perspective view of the chair frame without seat cushions or the backs;

FIG. 6, a fragmentary exploded view of the chair frame, similar to FIG. 5, with the back frames in place, to show the functioning of the torsion bars;

FIG. 7, a fragmentary horizontal sectional view, taken at 7–7 in FIGS. 6 and 9, looking down, to show the attachment of the torsion bar in the right-hand seat;

FIG. 8, a fragmentary cutaway perspective view of one end of the torsion bar to show the yoke and its housing;

FIG. 9, a fragmentary vertical section taken at 9–9 in FIG. 7, of the yoke and housing with the least amount of tension on the torsion bar;

FIG. 10, a similar sectional view showing the greatest amount of tension on the torsion bar;

FIG. 11, an exploded perspective view of the back;

FIG. 12, a perspective cutaway view of the back taken from the rear;

FIG. 13, a vertical sectional view of the back, the section being taken at the line 13–13 of FIG. 14;

FIG. 14, a horizontal sectional view of the back, the section being taken as indicated at line 14–14 of FIG. 13;

FIG. 15, a transverse sectional view of the arm rest, with the near side removed, to show the mechanism in the locked position with the back reclined;

FIG. 16, a top view of FIG. 15 with the upper surface removed to show the entire mechanism;

FIG. 17, a transverse sectional view, similar to FIG. 15, but with the mechanism released, and the back in the extreme forward position; and FIG. 18, an exploded perspective view of the reclining mechanism and the arm rest structure.

DETAILED DESCRIPTION

Figure 15:
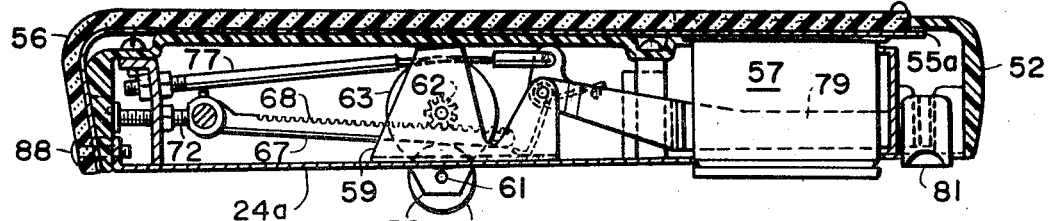

The reclining vehicle chair 10 consists of a frame 11, with an aisle end 12, a wall end 13, a leg assembly 14, and wall mounting brackets 15 and 16. The chair is equipped with two foot rests 17 and 18, two backs 19 and 20 and two seat cushions 21.

As shown best in FIG. 5, the frame 11 consists of a U-shaped tubular frame 22 with the rear ends bent upward at 23 to support the arm rest channels 24 and 24a. The frame is provided with front arm supports 25 of rectangular tubing, a stretcher tube 26 to which are mounted the center back bearing 27 and four foot rest mounting brackets 28 which extend forwardly and support the foot rests 17 and 18. A center tube 29 connects the stretcher tube 26 and front frame member 22. A square leg mounting tube 30 is secured to the U-tube 22 and stretcher tube 26, and is united to the front leg 32 having a single-hole foot pad 33, and to the rear leg 34 having a two-hole foot pad 35. The frame 11 includes the outer back bearings 36, the plates 37 and 38, and bracket 39 for attaching the inner and outer side panels.

The leg assembly 14 is comprised of two separate legs 32 and 34 with a cover 40 to hide their respective foot pads 33 and 35 and the attaching bolt heads. The nib 41 slips into a slot 42 in the front leg. The cover is attached to the rear leg with a screw 43 on the far side.

The rear foot pad 35 and rear wall mounting bracket 16 have two screw holes for mounting screws so that in the case of a sudden impact or deceleration of the bus, the chair will not be ripped loose and thrown forward.

The wall arm rest assembly 13 has an inner plastic panel 44, while the aisle arm rest assembly 12 has the same shaped inner panel 45 as well as an outer plastic panel 46 and a protective stainless steel insert panel 47. The nib 48 on the outer edge of the steel panel fits into a groove 49 of the plastic panel, thus providing a curved surface presenting no hazard to people walking down the aisle. Both sides employ a trim strip 50 at the rear, the strip having a steel core covered by vinyl-clad foam padding and thus protecting the knee-striking area. The mechanisms are each covered with a plastic arm cap 51 and 52, determined right or left by the finger slot 53 and slot 54 for the upper back pin, and a vinyl-clad foam pad 55.

There is an ash tray cover 56 built into the front portion of the foam pad 55, and an ash tray 57 permanently attached to the arm rest channels 24 and 24a.

Figure 16:
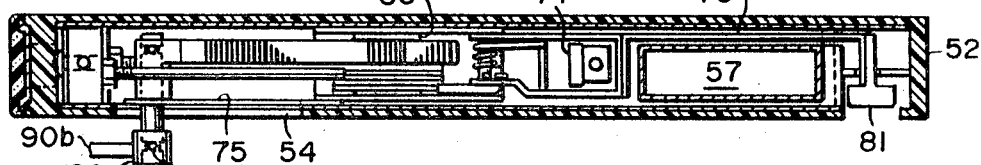
Figure 17:
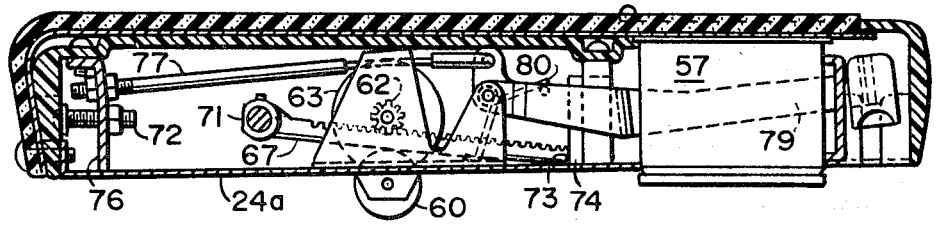
Figure 18:
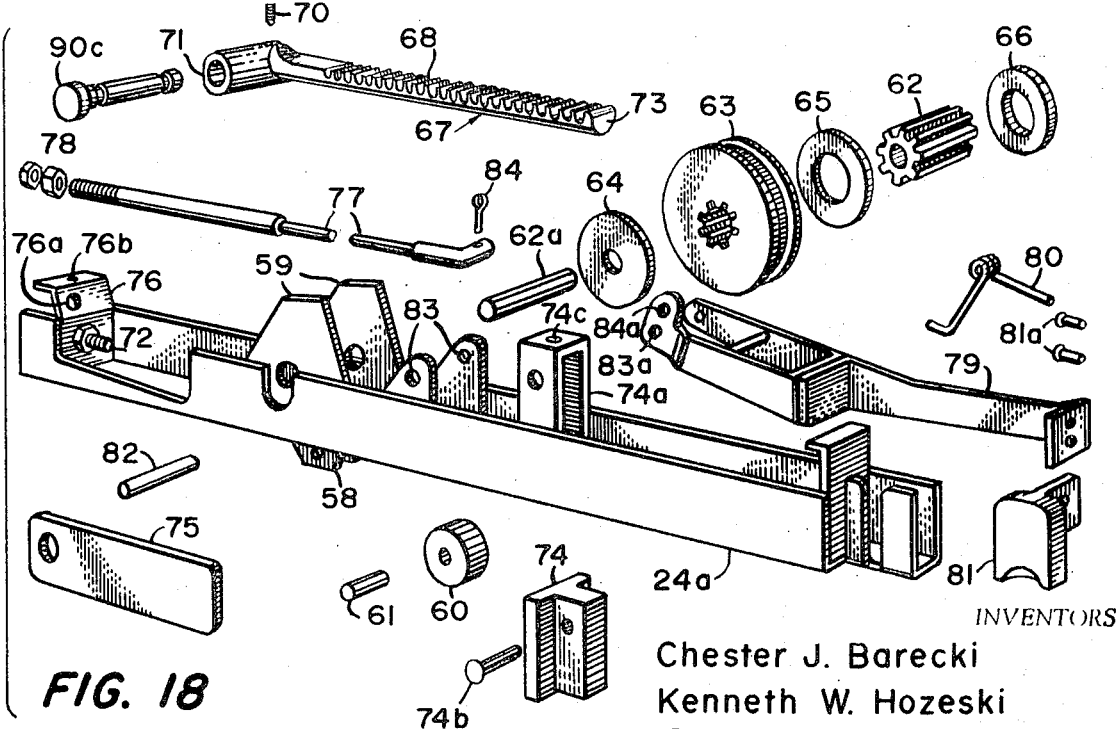

The arm rest mechanisms for controlling the position of the back are right and left, but they are similar in operation, and many of the parts are interchangeable. The left mechanism is shown in FIGS. 15–18.

The arm rest channel 24a has openings in its bottom for the ash tray 57 and for projections 58, which are a part of the mechanism bracket 59. This mechanism bracket 59 has a lower roller 60 held by a pin 61 and an upper pin 62a which supports a pinion gear 62. A pulley 63 fits onto one side of the pinion gear 62. There is a spacer washer on each side of the pulley, washer 64 with a small hole, and washer 65 which fits over the pinion gear. A thicker washer 66 fits onto the far end of the pinion gear.

The rack gear 67 rests between the washers 65 and 66, and rides between the pinion gear 62 and the roller 60 and moves the back forward and rearward as it travels. The rack gear is L-shaped, with a series of teeth 68 that engage the teeth of the pinion gear 62, a bushing 69 to receive the back pin 90c, a setscrew 70 to keep the pin in the bushing, a flat portion 71 which strikes the rear stop 72, and a slightly rounded front end 73, which strikes the forward stop 74. The pin 90c is slipped through the bushing 90a which is attached to the back frame 90 by means of a bracket 90b, through the hole in the cover plate 75 which closes the slot 54 to prevent finger pinching, and into bushing 69 of the gear rack 67; then the two setscrews 90d and 70 are inserted. This can best be seen in FIGS. 11 and 15 and may be done after the cover 52 is attached.

The adjustment screw 72 is held in a rear bracket 76 which serves as an anchor for the cable 77 at 76a by two nuts 78, and as a mounting bracket for the plastic arm rest cover at 76b.

The movement of the rack gear is controlled by the gripping and releasing of the pulley 63 by the cable 77 as the activating lever 79 is held down by the spring 80 or raised by the operator's finger, raising the knob 81. The activating lever 79 is anchored by the pin 82 onto the mechanism bracket 59 at 83. The cable 77 is attached to the activating lever at 84a by a cotter pin 84. The knob 81 is attached to the activating lever 79 by the two rivets 81a.

The rubber front stop 74 is held in a metal support 74a by a rivet 74b. This support is also a front support for the plastic cover at 74c.

The back is held firmly in position by the cable 77 gripping the pulley 63 until the knob 81 is raised by the operator's finger. This raises the activating lever 79 producing sufficient slack in the cable to allow the pulley to turn freely, which in turn permits the pinion gear to turn, freeing the rack gear to slide backward or forward, thus moving the back.

The plastic arm cover is preferably attached to the mechanism channel at 76b and 74c by screws before the back is attached to the rack gear 67 by pin 90c. There is a small hole 85 in the top of the cover for the insertion of the setscrew 70. Then the foam pad 55 is attached by sliding its front edge 86a into a slot 87a of the cover 51 or 52 and the rear projection 86b into a keyhole slot 87b. The foam pad 55 is held in place by a screw 88 at the rear.

The vinyl-clad foam pad, such as for the arm pad 55, the trim strip 50, and the crash panel 95, is made by spraying the inside of the mold with a coating of vinyl before filling it with the foam material. The foam and vinyl skin form an integral part with a steel stiffener.

The chair back is assembled in three steps as follows:

1. The plastic back panel 89 attaches to the steel frame 90 with five screws, three in the cross tube 91 and one on each side 92. Holes in the plastic panel are shown at 93 and 94.
2. The crash pad assembly 95 attaches to the plastic back panel with four hex nuts attached to bolt studs 96. This panel hides the three screws of step one. The four holes in the plastic panel are shown at 97. The top edge of the crash pad 98 clamps over the top edge 99 of the plastic backpanel, thus preventing the crash panel from being pulled away.
3. The back cushion attaches to the unit by having the near top edge of the aluminum inner panel 101 slide onto three projections 102 on the lower side of the upper tubular frame 90, and is held in place by two screws at the bottom of the cushion which attach to the two mounting angles 103.

There is a stiffener 101a at the top portion of the aluminum inner panel 101 to prevent the cushion from being pulled away from the plastic panel and crash panel. There is enough space at 111 to allow the inner panel 101 to be attached to the tubular frame 90, by being slid up onto the projections 102. This can best be seen in FIG. 13.

The foregoing structure enables the cushion to be removed for repair or replacement without having to remove the back assembly from the chair. It is only necessary to remove the lower two screws which attach the frame 101 to the mounting angles 103, and then the cushion frame can be slid down and out, with the unsnapping of the upholstery cover at the side pivot bracket at the rear of the arm rest.

The back assembly is automatically brought forward to the vertical position, upon the pushing of the knob 81 by means of a torsion bar 112 in the bottom of the tubular frame 90. The outer end of the torsion bar is held firmly by means of a square hole in the outer bearing 36, and held at the inner end by a yoke 113 which is attached to the tubular back frame 90 in such a way that it is adjustable to increase or decrease tension on the torsion bar. The yoke is held onto the bar by an "E" ring 114a. The yoke is housed in a metal boxlike structure 114 in the lower inner corner of the back frame. The yoke is free to turn back and forth as an adjustment screw 115 is turned in or out, to increase the tension as in FIG. 10 or to decrease it as in FIG. 9, respectively. A small plastic plug cap 116 is removed from the plastic back panel 89 in order to turn the adjustment screw 115 with an Allen wrench, then replaced by pressing on.

The back swings freely on the center bushing 27. A second bushing 117 encases the torsion bar where it passes through the bushing 118 in the tubular back frame, and turns with it, to absorb the weight of that side of the back, and to transfer this weight to the outer bearing 36, so that there is no external force on the torsion bar.

The foot rests 17 and 18 with their arcuate boomerang-shaped sidewalls follow the contour of the seat and seat back in movements to rear and forward positions.

A complete back cushion assembly is made by cementing the foam pad 106 to the aluminum inner panel 101, and covering it with the upholstery cover 104 which is cemented to the back side of the aluminum inner panel at 105.

The cover 104 contains an additional slab of foam pad with a muslin backing 107 in the lower center portion to achieve the desired quilting effect 108 in the cover. The headrest portion consists of two pieces of material 109a and 109b joined with a French seam 110 to produce a smooth double curve effect, concave and convex.

While in the foregoing specification we have set out specific structure in considerable detail for the purpose of illustrating embodiments of the invention, it will be understood that such details may be varied widely by those skilled in the art without departing from the spirit of our invention.

We claim:

1. A vehicle seat comprising a seat frame, a back frame pivotally mounted on said seat frame, spring means normally urging said back frame to upright position, a hollow arm rest mounted on said seat frame and provided with means for controlling the movement of said back to inclined and upright positions, connections between said back frame and said control means, said arm rest having a front end closed on all sides except for a side opening, a lever pivotally mounted in said arm rest for actuating said control means, and a knob secured to a forward end of said lever and housed within the closed end of said arm rest, said knob being accessible through said side opening for moving said lever and connected to said lever by a web, said arm rest being provided with a slotted guard adjacent said side opening receiving said web.

2. The structure of claim 1, in which said knob substantially fills the outer end of said side opening.

3. A vehicle seat comprising a seat frame, a back frame pivotally mounted on said seat frame, spring means normally urging said back frame to upright position, a hollow arm rest mounted on said seat and provided with means for controlling the movement of said back to inclined and upright positions, said control means including a rack bar, link means between said back frame and said rack bar, said arm rest being longitudinally slotted on one side to receive said link means, and a finger guard slide apertured to receive said link means and movable therewith to close said longitudinal slot.

4. The structure of claim 3 in which said link means includes a pin extending through said slide and secured to said rack bar.